United States Patent [19]

Nakayama et al.

[11] 4,252,332
[45] Feb. 24, 1981

[54] SEALING DEVICE

[75] Inventors: Shozo Nakayama, Kariya; Masayuki Kurahashi, Nagoya; Tsuneo Sugiura, Hekinan, all of Japan

[73] Assignee: Kabushiki Kaisha Toyoda Jidoshokki Seisakusho, Aichi, Japan

[21] Appl. No.: 911,542

[22] Filed: Jun. 1, 1978

[30] Foreign Application Priority Data

Jun. 1, 1977 [JP] Japan .................................. 52-71473

[51] Int. Cl.$^3$ .............................................. F16J 15/10
[52] U.S. Cl. .................................... 277/168; 277/215; 285/DIG. 19
[58] Field of Search .................... 277/165, 166, 79, 26, 277/180, 215; 285/DIG. 19; 277/168, 169

[56] References Cited

U.S. PATENT DOCUMENTS

| 392,931 | 11/1888 | Prindle | 277/169 |
| 2,614,793 | 12/1948 | Storm | 285/DIG. 19 |
| 3,191,949 | 6/1965 | Lansky et al. | 277/168 |
| 3,231,289 | 1/1966 | Carrell | 277/166 |
| 3,462,161 | 8/1969 | Daubenberger et al. | 277/166 |
| 4,089,534 | 5/1978 | Litherland | 277/215 |

Primary Examiner—Robert I. Smith
Attorney, Agent, or Firm—Sughrue, Rothwell, Mion, Zinn & Macpeak

[57] ABSTRACT

A pair of blocks or shell members of an appliance or the like are mated with each other, and an O-ring is fitted in an O-ring groove provided in the mating end surface of one of the shell members along the entire circumference thereof. In addition, a narrow annular clearance space is provided in a mating plane of the mating end surfaces of the shell members on the side close to the outer peripheral surface of the shell members, when assembled, i.e., radially outwards of the O-ring groove, in a manner to communicate with the exterior of the shell members, so that oil trapped in voids defined between an O-ring, and the walls of the O-ring groove and a mating surface of the counterpart shell, after the assembly of the shell members, may be removed with a cleaning liquid with ease. The annular clearance space may be provided either in the mating end surface of one shell member, in which the O-ring groove is formed, or in the mating end surface of the counterpart shell member having no O-ring groove therein.

5 Claims, 4 Drawing Figures

SEALING DEVICE

BACKGROUND OF THE INVENTION

1. Field of the invention

This invention relates to improvements in a sealing device and more particularly to a sealing device for use in the mating surfaces of blocks or shell members, such as cylinder blocks in a compressor.

2. Description of the Prior Art

FIG. 1 shows a conventional, swash-plate type compressor, in which the walls of cylinder blocks 1 and 2 form shell members of the compressor. In this compressor, an O-ring device 3 is provided in one of the mating end surfaces of the cylinder blocks 1, 2, thereby providing a seal therebetween. In this respcect, it has been a general practice that, as shown in FIG. 4, an annular O-ring groove 4 is provided in one of the mating end surfaces of the cylinder blocks 1, 2 along the circumference thereof, while an O-ring 5 has a transverse cross-sectional area giving a diameter greater than the depth of the O-ring groove 4 and is fitted in the O-ring groove 4. Then, the mating end surfaces of the cylinder blocks 1, 2 are brought into a mated realtion, so that the O-ring is compressed by the mating surface of another counterpart cylinder block with the cooperation of the walls of the O-ring groove 4, thereby providing a good seal for the shell members or cylinder blocks of a compressor. According to the prior art sealing device of the type described, there may be established complete seals between the O-ring 5 and the bottom of the O-ring groove 4, and between the O-ring 5 and the mating surface of a counterpart shell member or cylinder block 2, while the portions of the mating surfaces, other than the O-ring groove 4, provide incomplete metal-to metal seals, with the result that a void 6 in the O-ring groove 4, as shown, is maintained in an incompletely sealed condition to the exterior of the compressor, while a void 7 therein is maintained in an incompletely sealed condition to the inner cavities of the cylinder blocks.

In addition, it has been also a general practice, upon the assembly of a compressor, to apply lubricating oil to the contacting surfaces of respective parts or components so as to improve the slidability of the parts in a compressor as well as the sealing performance of the O-ring and the like, and then to remove the lubricating oil clinging to the surfaces of the parts in the compressor therefrom, after the assembly thereof, with the aid of a cleaning liquid, followed by the delivery to the succeeding step of the manufacture of the compressor, such as a packing step. However, the aforenoted prior art compressors suffer from a shortcoming stemming from lubricating oil which is trapped in the void 6 in the O-ring groove, after the assembly thereof. More specifically, it offers a considerable difficulty for a cleaning liquid to pass through a mating plane or portion 8 of the mating surfaces of the cylinder blocks, which portion is positioned radially outwardly of the O-ring groove 4, because the mating portion 8 provides a metal-to metal seal, which is not complete from a viewpoint of an ideal sealing performance, with the result that the lubricating oil trapped or residual in the void 6 can hardly be removed with a cleaning liquid, so the lubricating oil dwells intact in the void 6, even after the delivery of a product, i.e., a completed compressor, following a packing step. However, as the time goes on (for instance, after the lapse of a relatively long period of time, such as several days), the lubricating oil trapped in the void 6 exudes past the aforenoted mating portion 8 which provides an incomplete seal, thereby staining a package or the surface of a compressor, leading to a critical defect from the viewpoint of quality control.

SUMMARY OF THE INVENTION

It is accordingly an object of the present invention to provide a sealing device for use in a compressor, which is free of a stain in a package or a compressor itself, even after the completion of the manufacture, by removing an excessive or unwanted lubricating oil trapped in the sealing device, upon the assembly of the compressor.

According to the present invention, there is provided a sealing device for use in a swash-plate type compressor, in which a narrow clearance space is provided due to a recessed surface formed in one of the mating end surfaces of a pair of cylinder blocks of a compressor along the entire circumference of the aforenoted one of mating surfaces, on the side closer to the outer peripheral surface of the cylinder blocks, when assembled.

DESCRIPTION OF THE PREFERRED EMBODIMENTS

Figure 1:
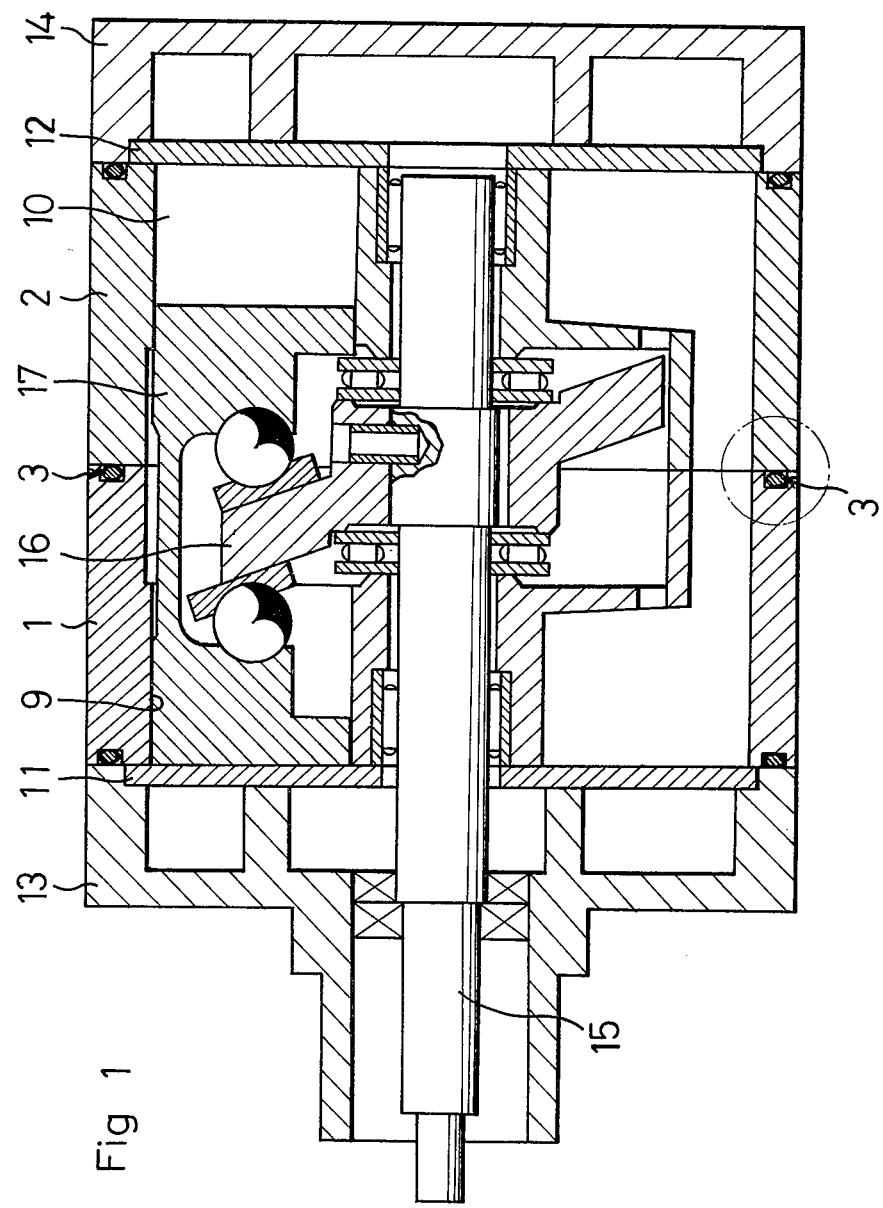
FIG. 1 is a longitudinal cross-sectional view of a compressor shown in its entirety.
Figure 2:
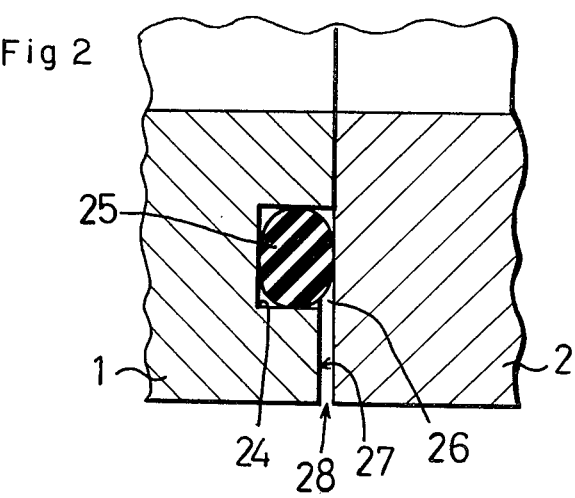
FIG. 2 is a cross-sectional view of an essential part of one embodiment of the invention.
Figure 3:
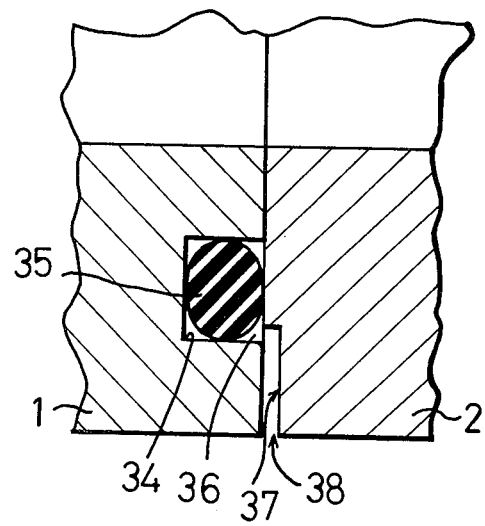
FIG. 3 is a cross-sectional view showing an essential part of another embodiment of the invention.
Figure 4:
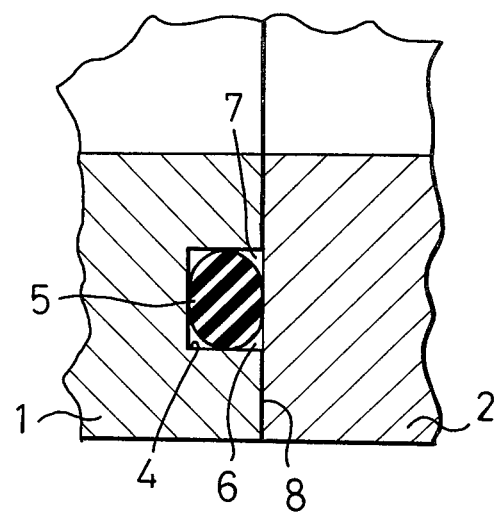
FIG. 4 is a cross-sectional view showing an essential part of prior art sealing device for use in a compressor.

Referring to FIG. 1, there is shown a typical swash-plate type compressor, in which: there are provided two or more sets of cylinder bores 9,10 which are arranged in the axial direction of the compressor; the end surfaces of the cylinder blocks 1,2 which are not mated with each other are sealingly closed with housings 13,14 through the medium of valve plates 11,12; and a piston 17 engages a swash-plate 16 secured to a drive shaft 15 extending along the axis of the compressor, in a position opposed to a mating position of the cylinder blocks 1,2, so that the piston 17 may be reciprocated in the cylinder bores 9, 10. As shown in FIGS. 2 and 3, an O-ring device is provided in one of the mating surfaces of the cylinder blocks 1,2. More particularly, an annular O-ring groove 24 is provided in the mating end surface of the cylinder block 1, while annular recessed surface 27 is provided in the aforenoted mating end surface on the side closer to the outer periphery of the shell, thereby providing a clearance space 28 between the annular recessed surface 27 and the mating surface of the counterpart cylinder block 2, when the cylinder blocks 1, 2 are mated with each other. Meanwhile, the annular recessed surface may be provided continuously or divided into two or more arcuate grooves at a given spacing along the entire circumference of the mating surface of the cylinder block 1. In case the annular recessed surface 27 is provided in discontinued relation, i.e., two or more arcuate recessed surfaces 27 are provided, then the total arcuate length of the recessed surfaces 27 should be over half the entire circumference of the cylinder block 1. The diameter of an O-ring 25 fitted in the O-ring groove 4 in its transverse cross section is greater in dimension than the depth of the groove 4. It is recommended that the width of the aforenoted clearance space 28 be not less than 0.05 mm and not more than 20% of the diameter of the O-ring 25, as measured in its transverse cross section.

It should be noted however that the continuous annular clearance space or the discontinued clearance spaces thus divided communicate with the exterior of the cylinder blocks, when assembled.

With the O-ring device having the aforenoted arrangement, lubricating oil trapped in the void 26 in the O-ring groove 24, upon the assembly of the compressor, may be completely removed with a cleaning liquid with ease in its cleaning step of the manufacture of a compressor. The test results reveal that in case the width of the clearance space 28 is 0.05 mm which is on the lower limit of a preferable range thereof, there takes place no oil leakage after the cleansing, and in case the width of the clearance space 28 is 20% of the diameter of the O-ring 25 in its transverse cross section, then the cylinder blocks are found to be acceptable in a sealing-test given at a pressure of 110 kg/cm$^2$.

While the present invention has been described herein with reference to certain exemplary emodiments thereof, it should be understood that various changes, modifications and alterations may be effected, without departing from the spirit and the scope of the present invention, as defined in the appended claim.

What is claimed is:

1. A sealing arrangement comprising two mating hollow members disposed in abutting relation to define a casing, first and second axially directed mating surfaces on said two members respectively, an annular groove located in one of said first and second mating surfaces, an O-ring disposed in said groove and a recess located in one of said first and second mating surfaces to define a passageway in communication with said groove and the exterior of casing defined by said hollow members when said mating surfaces are disposed in contact with each other.

2. A sealing arrangment as set forth in claim 1, wherein said recess and said groove are both located in the same mating surface.

3. A sealing arrangement as set forth in claim 2, wherein said recess and said groove are located in different mating surfaces.

4. A sealing arrangement as set forth in claim 1, 2 or 3, wherein said O-ring has a transverse cross-section greater in dimension than the depth of said groove.

5. A sealing arrangement as set forth in claim 4, wherein the depth of said recess is not less than 0.05 mm and not more than 20% of the diameter of the O-ring as measured in its transverse cross-section in non-compressed condition.

* * * * *